United States Patent [19]

Sarcona

[11] Patent Number: 5,125,326

[45] Date of Patent: Jun. 30, 1992

[54] THREE POSITION ACTUATOR HAVING A NEUTRAL NORMAL POSITION FOR SHIFTING A TWO SPEED TRANSFER CASE

[75] Inventor: David M. Sarcona, Warren, Mich.

[73] Assignee: Rockwell International Corporation, Pittsburgh, Pa.

[21] Appl. No.: 647,388

[22] Filed: Jan. 29, 1991

[51] Int. Cl.$^5$ .............................................. F01B 7/00
[52] U.S. Cl. ........................................ 92/62; 92/75; 92/131; 92/135; 74/364
[58] Field of Search ..................... 92/13.1, 13.3, 13.5, 92/13.6, 62, 65, 75, 131, 135, 150, 151; 74/335, 364; 91/173

[56] References Cited

U.S. PATENT DOCUMENTS

| | | | |
|---|---|---|---|
| 2,299,211 | 10/1942 | Clench | 92/62 |
| 2,438,390 | 3/1948 | Eroson | 92/131 |
| 2,575,982 | 11/1951 | Stevens | 92/62 |
| 3,469,503 | 9/1969 | Adler et al. | 92/62 |
| 3,958,493 | 5/1976 | Fujita et al. | 92/13.6 |
| 4,033,233 | 7/1977 | Toi | 92/131 |
| 4,125,059 | 11/1978 | Tuji | 92/151 |
| 4,205,594 | 6/1980 | Burke | 92/151 |

FOREIGN PATENT DOCUMENTS

| | | | |
|---|---|---|---|
| 7506078 | 2/1975 | France | 91/173 |
| 0043205 | 3/1984 | Japan | 92/13.1 |
| 2077856 | 12/1981 | United Kingdom | 92/62 |

Primary Examiner—Thomas E. Denion

[57] ABSTRACT

A three position actuator which is used to position the gear range control lever on a two speed transfer case. Three positions are required to achieve HIGH, LOW and NEUTRAL. Two individual air chambers may be selectively charged with compressed air to move two pistons along a common actuator rod to achieve linear translation of the control lever to selectively position the transfer case in HIGH, NEUTRAL or LOW range. The transfer case is shifted from LOW to NEUTRAL or HIGH to NEUTRAL by releasing the respective charge of compressed air thereby permitting a spring to shift the control lever to neutral. Thus, in the event of a failure of the system supplying the compressed air, the actuator will return the transfer case to NEUTRAL as required for towing.

2 Claims, 3 Drawing Sheets

THREE POSITION ACTUATOR HAVING A NEUTRAL NORMAL POSITION FOR SHIFTING A TWO SPEED TRANSFER CASE

BACKGROUND OF THE INVENTION

1. Field of the Invention

The present invention relates to remote actuator devices and specifically to an actuator device which may be used to remotely select a gear range for a two speed transfer case.

1. Description of the Prior Art

Presently two speed transfer case gear selection is accomplished by force applied through a sleeved cable connected to the transfer case gear range control lever. The force is typically applied through a driver operated lever located in the cab of the vehicle. Frictional resistance in the sleeved cable increases the force which the driver must apply to the lever to accomplish a shift of the transfer case. In large trucks the cable must be routed a great distance and often through a circuitous path. Consequently, a great deal of force is required to shift the transfer case through a sleeved cable.

Remote actuator devices are available which derive motive force from compressed air, hydraulic fluid or electrical energy. Simple actuation devices utilizing these sources of motive force are subject to failure upon interruption of the source of motive force. Such a failure manifests itself as a transfer case which is stuck in the gear range previously selected. The previous gear selection is only by coincidence that which is appropriate for towing. Therefore, these exits a need to provide a stand-by supplemental motive force which will shift the transfer case to neutral in the event of interruption of the source of motive force.

SUMMARY OF THE PRESENT INVENTION

The present invention includes a three position actuator which is used to position the gear range control lever on a two speed transfer case. Three positions are required to achieve HIGH, LOW and NEUTRAL. Two individual air chambers may be selectively charged with compressed air to move two pistons along a common actuator rod to achieve linear translation of the control lever to selectively position the transfer case in HIGH, NEUTRAL or LOW range. The transfer case is shifted from LOW to NEUTRAL or HIGH to NEUTRAL by releasing the respective charge of compressed air thereby permitting a spring to shift the control lever to neutral. Thus, in the event of a failure of the system supplying the compressed air, the actuator will return the transfer case to NEUTRAL as required for towing.

The present invention also includes an embodiment featuring a remote actuator for controlling the position of a gear control lever including an actuator rod having a first and second portion, a first piston having first and second coaxial bores, the first bore of the first piston is positioned for reciprocation with respect to the first portion of the actuator rod, a second piston is fixed to the actuator rod for reciprocation therewith and maintained in sealing relation with the second bore of the first piston, a first housing defining a first housing bore sealingly receiving the first piston, a third piston positioned for reciprocation on the second portion of the actuator rod, a second housing defining a second housing bore sealingly receiving a third piston, a first chamber defined by the first housing bore, the first and second piston which may be pressurized to displace the first and second piston and the actuator rod from an initial position to a first position, a second chamber defined by the second housing bore and the third piston which may be pressurized to displace the third piston and the actuator rod to a second position, a first spring engaging the first piston and the first housing, and a second spring engaging the third piston and the second housing wherein the first and second spring define an initial position to which the actuator rod returns upon release of pressure from the first and second chambers. In addition, the first piston has a first end portion, an intermediate axially connecting portion and a second end portion whereby the first end portion is axially spaced from the second end portion and wherein the first end portion engages the first bore of the first housing upon displacement of the actuator rod in reaction to pressurizing the second chamber to define a first position limit and the second end portion engages a stop to define a second position limit upon release of pressure from the second chamber and displacement of the actuator rod by the first spring. Finally, the third piston has an end portion which engages the second housing bore to define a third position limit upon displacement of the actuator rod in reaction to pressurization of the first chamber.

These and other aspects of the present invention will become more readily apparent by reference to the following detailed description of the embodiments as shown in the drawings.

DETAILED DESCRIPTION OF THE PREFERRED EMBODIMENT

Figure 1:
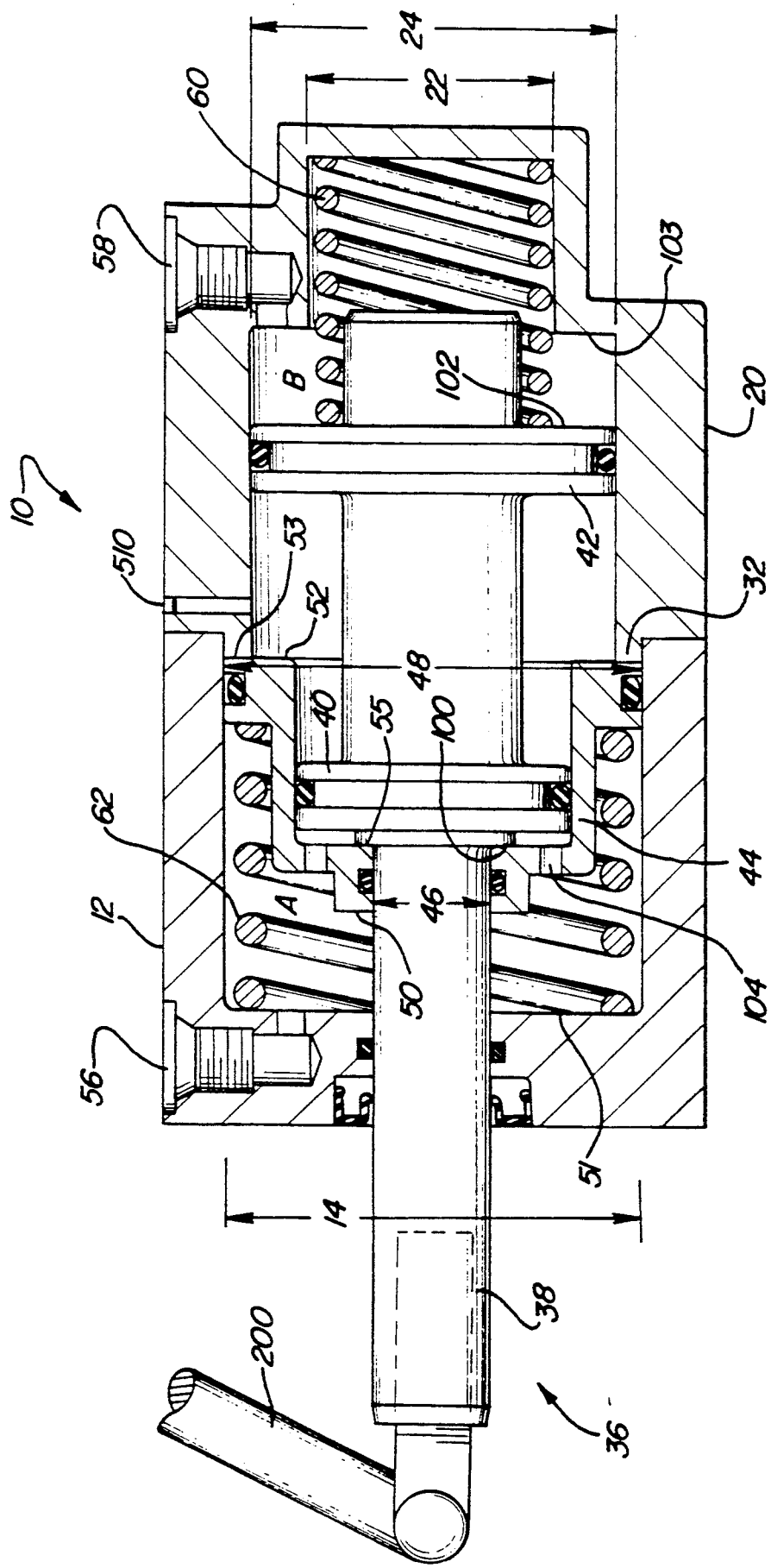
FIG. 1 is a section view of the present invention showing the actuator in initial position with the transfer case in neutral.

The present invention includes an actuator 10 having an actuator rod 36 which is linearly positionable to achieve desired gear range selections (LOW, NEUTRAL, and HIGH) on a transfer case gear control lever 200. The actuator consists of a first housing 12 having a bore having a diameter indicated as 14. A second housing 20 includes a bore having two annular sections. The first section having a diameter indicated as 22 the second as 24. Piston stop 32 is formed by an annular flange extending axially from housing 20 into bore 14. Actuator rod 36 is linearly positionable within housing 12 and 20 and includes a first portion 38. A second portion 40 and a third portion 42. Slidable piston 44 has a first diameter portion 46, a second diameter portion 48, in addition to a first annular face 50 and second annular face 52. The first diameter portion 46 of the slidable piston 44 sealingly engages the first diameter portion 38 of the actuator rod 36. The second diameter portion 48 qf the slidable piston 44 sealingly engages bore 14 of housing 12. First annular face 50 of slidable piston 44 engages face 51 of housing 12 to define a travel limit therefore. Second annular face 52 interacts with annular face 53 of piston stop 32 to define a travel stop in the opposing direction. In this manner, annular faces 51 and 53 respectively define the limits of travel of slidable piston 44. A third annular face 100 on slidable piston 44 engages annular face 55 which is located on the actuator rod 36. Slidable piston 44 has an opening 104 which permits compressed air from port 56 to reach piston 40. Therefore, housing 12 piston 40 and piston 44 define a variable volume chamber A. Chamber A may be connected by port 56 to a source of compressed air to control the pressure in chamber A. A second chamber B is defined by housing 20 and piston 42. Chamber B may be selectably connected to a source of compressed air through port 58. Spring 60 and spring 62 are compression spring which are capable of displacing actuator rod 36 to NEUTRAL position upon release of compressed air supplied to chamber A and B. Vent 510 communicates to atmosphere preventing air entrapment between pistons 40, 42 and 44 in bore 24.

In operation, an initial position, as shown in FIG. 1, is one in which no compressed air is supplied to chamber A or B. In this position, spring 62 forces piston 44 against face 53; whereas spring 60 forces actuator rod 36 against face 100 of piston 44. Spring 62 will produce slightly more force than spring 60. The resultant effect is to maintain actuator rod 36 in NEUTRAL position as shown in FIG. 1. In this position the vehicle may be towed. Thus, in the event of loss of compressed air, if the transfer case is in any gear range other than NEUTRAL, springs 60 and 62 will automatically displace the actuator rod 36 returning the transfer case to NEUTRAL.

Figure 2:
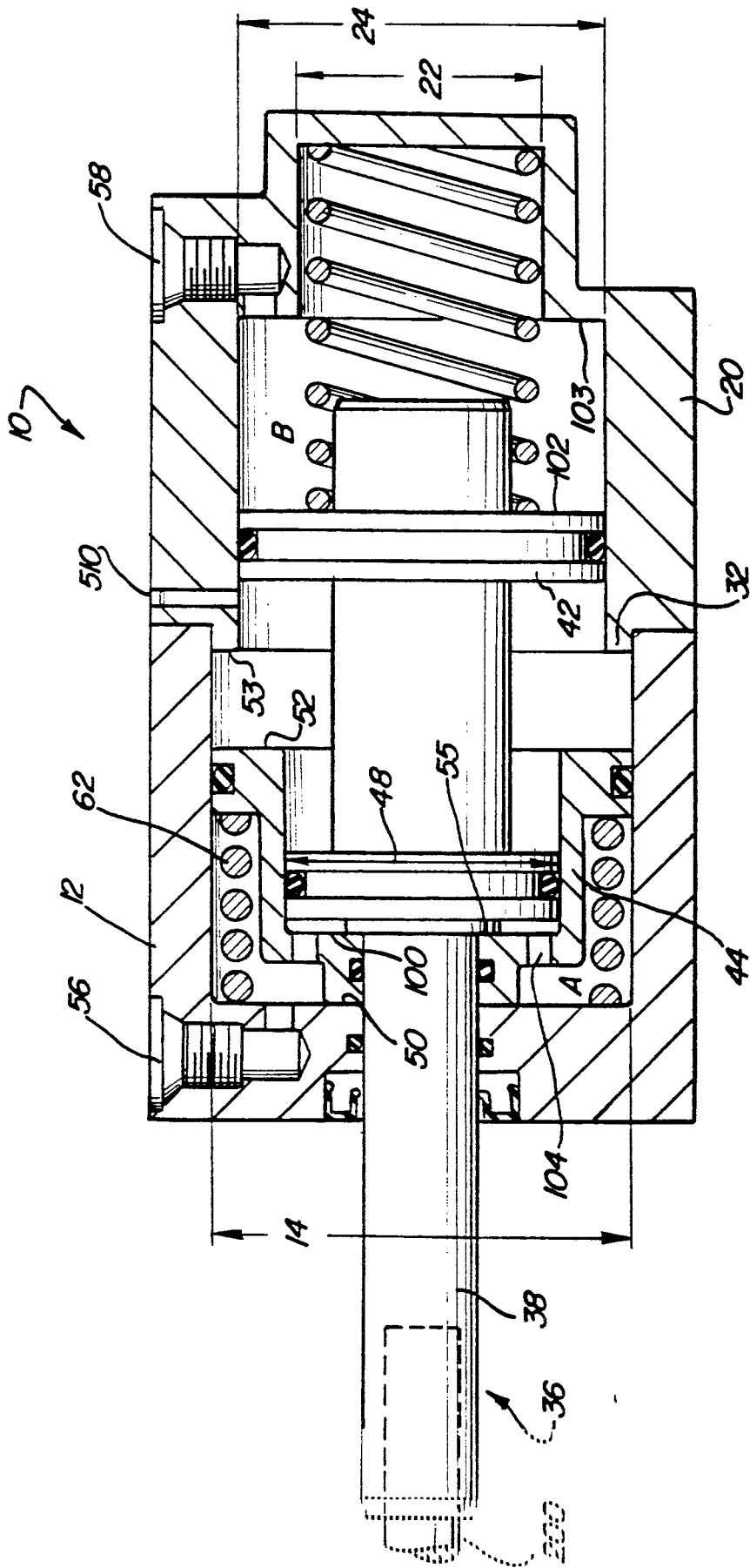
FIG. 2 is a sectional view with the actuator positioned to shift the transfer case into LOW gear range.

If the driver wishes to place the transfer case in low gear range, compressed air is supplied to chamber B thereby displacing piston 42, actuator rod 36 and slidable piston 44 from the initial positions shown in FIG. 1 to that shown in FIG. 2. When the annular face 50 engages the annular face 51, the piston will cease displacement. If compressed air is released from chamber B, spring 62 will provide force against slidable piston 44 and translate actuator 36 until annular face 52 meets annular face 53 of stop 32.

Figure 3:
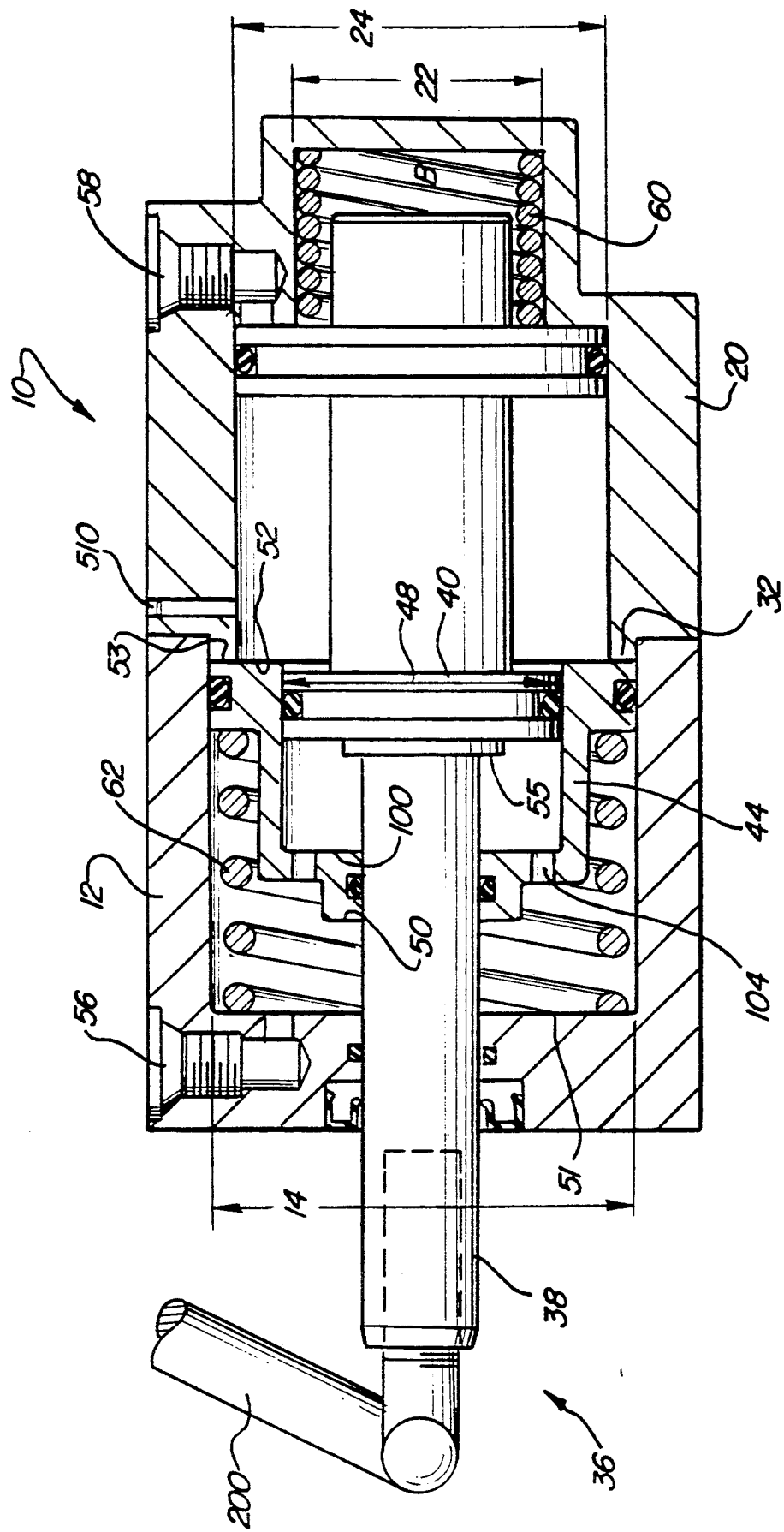
FIG. 3 is a sectional view with the actuator positioned to shift the transfer case into HIGH gear range.

If the driver desires to shift to HIGH gear range, compressed air is directed to chamber A through port 56. Compressed air will displace piston 40 compressing spring 60 until annular face 102 engages annular face 103, as shown in FIG. 3. At this point actuator rod 36 will have reached the end of its travel compressing spring 60 to its minimum dimension. With actuator rod 36 in this position, the transfer case will be shifted into HIGH gear range. If compressed air is released from chamber B, spring 60 will provide force against piston 42 causing translation of actuator 36 until face 55 of piston 40 contacts face 100 of piston 44.

One skilled in the art will readily recognize that certain specific details shown in the foregoing specification and drawings are exemplary in nature and subject to modification without departing from the teachings of the disclosure. Various modifications of the invention discussed in the foregoing description will become a parent to those skilled in the art. All such variations that basically rely on the teachings through which the invention has advanced the art are properly considered within the spirit and scope of the invention.

I claim:

1. A remote actuator for controlling the position of a gear control lever comprising:

an actuator rod having a first and second portion;

a first piston having first and second coaxial bores;

said first bore disposed for reciprocation and maintained in sealing relation with respect to said first portion of said actuator rod;

a second piston fixed to said actuator rod for reciprocation therewith in sealing relation with said second bore of said first piston;

a first housing defining a first housing bore sealingly receiving said first piston;

a third piston disposed for reciprocation on said second portion of said actuator rod;

a second housing defining a second housing bore sealingly receiving said third piston;

a first chamber defined by said first housing bore, said first and said second piston which may be pressurized to displace said first and second piston and said actuator rod from an initial position to a first position;

a second chamber defined by said second housing bore and said third piston which may be pressurized to displace said third piston and said actuator rod to a second position;

a first spring engaging said first piston and said first housing;

a second spring engaging said third piston and said second housing wherein said first and second spring define an initial position to which said actuator rod returns upon release of pressure from said first and second chambers; and said first piston has a first end portion, an intermediate axially connecting portion and a second end portion whereby said first end portion is axially spaced from said second end portion and wherein said first end portion engages said first bore of said first housing upon displacement of said actuator rod in reaction to pressurizing said second chamber to define a first position limit and said second end portion engages a stop to define a second position limit upon release of pressure from said second chamber and displacement of said actuator rod by said first spring.

2. A remote gear range actuator as in claim 1 wherein said third piston has an end portion which engages said second housing bore to define a third position limit upon displacement of said actuator rod in reaction to pressurization of said first chamber.

* * * * *